(12) United States Patent
Wasson et al.

(10) Patent No.: US 7,311,444 B2
(45) Date of Patent: Dec. 25, 2007

(54) HYDROSTATIC BEARING FOR LINEAR MOTION GUIDANCE

(75) Inventors: Kevin Lee Wasson, Pine City, NY (US); Terrence Sheehan, Elmira, NY (US); Daniel Soroka, Horseheads, NY (US)

(73) Assignee: Hardinge Inc., Elmira, NY (US)

( * ) Notice: Subject to any disclaimer, the term of this patent is extended or adjusted under 35 U.S.C. 154(b) by 0 days.

(21) Appl. No.: 11/483,629

(22) Filed: Jul. 11, 2006

(65) Prior Publication Data

US 2006/0251345 A1   Nov. 9, 2006

Related U.S. Application Data

(62) Division of application No. 10/617,390, filed on Jul. 11, 2003, now abandoned.

(60) Provisional application No. 60/406,933, filed on Aug. 30, 2002.

(51) Int. Cl.
*F16C 32/06* (2006.01)
*F16C 33/10* (2006.01)

(52) U.S. Cl. .......................... 384/12; 384/13
(58) Field of Classification Search ............... 384/12, 384/13, 15
See application file for complete search history.

(56) References Cited

U.S. PATENT DOCUMENTS

| | | | |
|---|---|---|---|
| 2,449,297 A | 9/1948 | Hoffer | |
| 3,355,990 A | 12/1967 | Helmut-Thum | |
| 3,499,690 A | 3/1970 | Siebers | |
| 3,508,430 A * | 4/1970 | Edmondson | 72/456 |
| 3,582,159 A | 6/1971 | Uhtenwoldt | |
| 3,635,532 A | 1/1972 | Zerbola | |
| 3,717,392 A | 2/1973 | Ennis | |
| 3,754,799 A | 8/1973 | Hedberg | |
| 3,871,721 A | 3/1975 | Siebert | |
| 3,900,233 A | 8/1975 | Thomson | |
| 4,080,009 A | 3/1978 | Marathe et al. | |
| 4,226,483 A | 10/1980 | Yamamoto | |
| 4,272,216 A | 6/1981 | Osburn | |
| 4,351,574 A | 9/1982 | Furukawa et al. | |

(Continued)

FOREIGN PATENT DOCUMENTS

DE       33 39 316      5/1985

(Continued)

*Primary Examiner*—Thomas R. Hannon
*Assistant Examiner*—Justin Krause
(74) *Attorney, Agent, or Firm*—Pillsbury Winthrop Shaw Pittman LLP

(57) ABSTRACT

A self-compensating hydrostatic (pressurized fluid film) linear bearing that maintains a fluid gap between a carriage and a rail when relative forces are applied. The geometric shape of the rail and mating carriage enable the bearing to have very high stiffness and load capacity without exessive detrimental carriage deformation. The carriages contain bearing grooves and lands which control and use fluid pressure to provide a very high degree of restoring force in response to changes in the fluid gap. The fluid emanating from the bearing gap is prevented from immediately leaking from the bearing carriage, and is instead routed back to the source from which it is pumped, thereby sealing the bearing carriage and simplifying the handling of the lubricating fluid. The hydrostatic bearing is particularly designed to be compact and to be bolt-for-bolt compatible with conventional linear bearings.

16 Claims, 7 Drawing Sheets

U.S. PATENT DOCUMENTS

| | | |
|---|---|---|
| 4,368,930 A | 1/1983 | Duchaine |
| 4,692,039 A | 9/1987 | Teramachi |
| 4,749,283 A | 6/1988 | Yokomatsu |
| 4,753,311 A * | 6/1988 | Berger et al. ............... 180/125 |
| 4,932,067 A | 6/1990 | Pester |
| 4,978,233 A * | 12/1990 | Stotzel et al. ................ 384/12 |
| 5,010,794 A | 4/1991 | Klager |
| 5,104,237 A | 4/1992 | Slocum |
| 5,391,002 A | 2/1995 | Eigenbrod |
| 5,447,375 A | 9/1995 | Ochiai et al. |
| 5,466,071 A | 11/1995 | Slocum |
| 5,484,208 A | 1/1996 | Kane et al. |
| 5,488,771 A | 2/1996 | Devitt et al. |
| 5,971,614 A * | 10/1999 | Kane et al. ................... 384/12 |
| 5,980,110 A | 11/1999 | Lyon |
| 6,012,845 A | 1/2000 | Lyon |
| 6,086,255 A | 7/2000 | Lyon |
| 6,149,306 A | 11/2000 | Zosi |
| 6,250,805 B1 | 6/2001 | Kuwahara |
| 6,257,766 B1 | 7/2001 | Agari |
| 6,315,449 B1 | 11/2001 | Mueller |
| 6,428,210 B1 | 8/2002 | Kafai |

FOREIGN PATENT DOCUMENTS

| | | |
|---|---|---|
| EP | 0 070 375 | 1/1983 |
| EP | 0 304 090 | 2/1989 |
| EP | 0 400200 | 12/1990 |
| JP | 6-21323 | 1/1994 |
| JP | 6-213235 | 8/1994 |

* cited by examiner

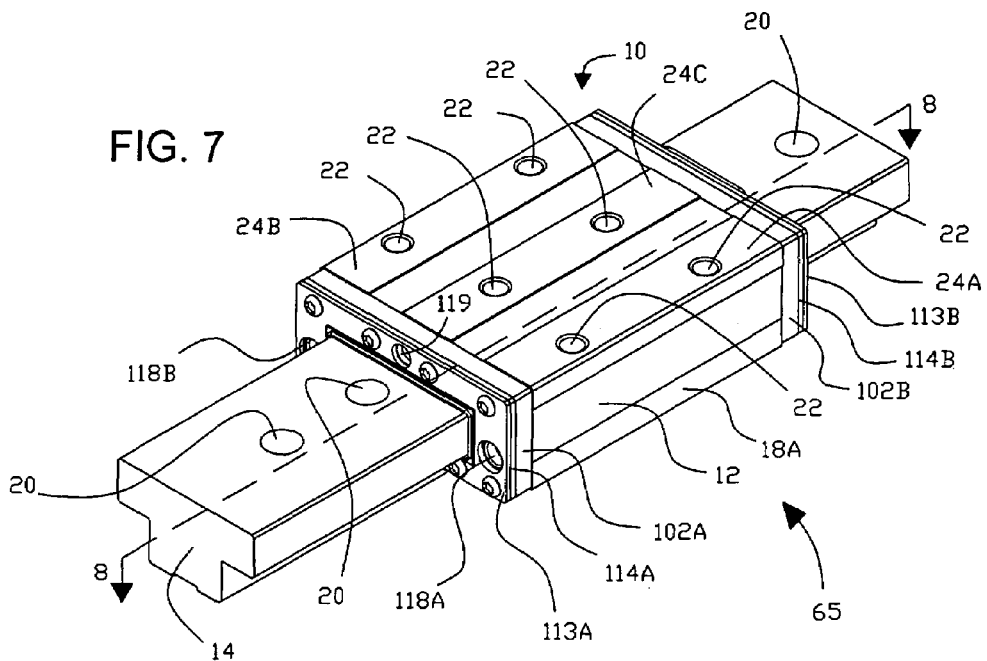
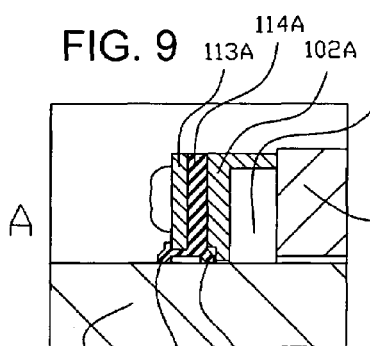
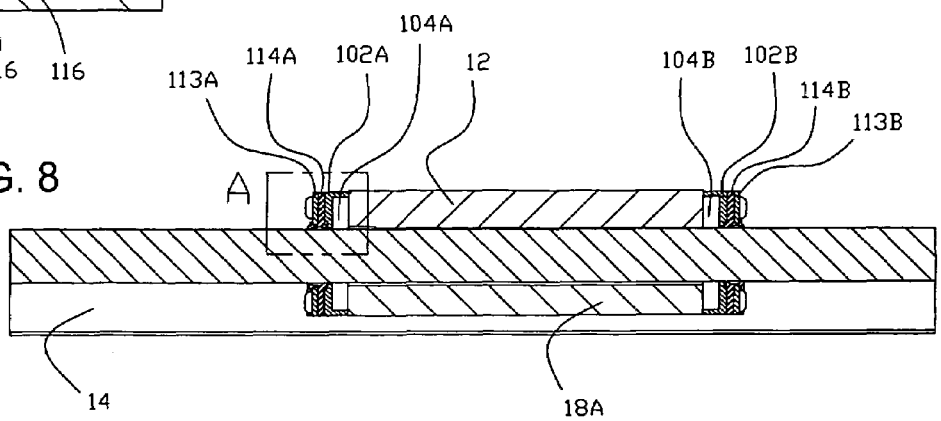

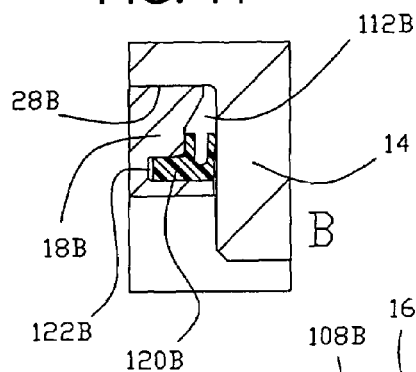
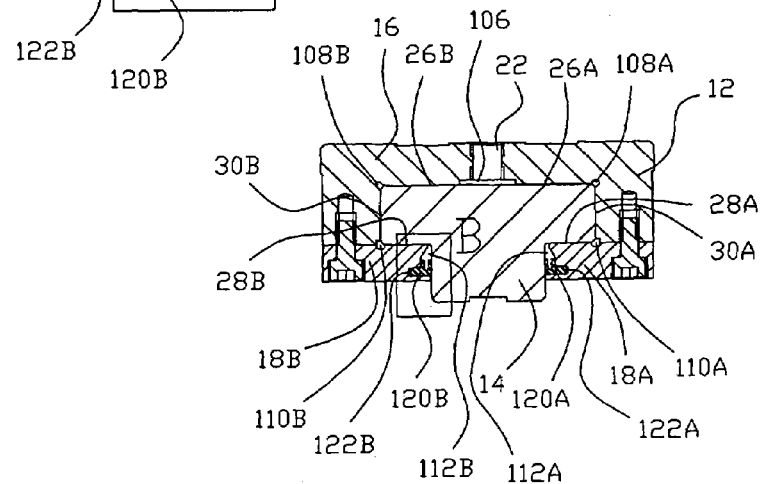
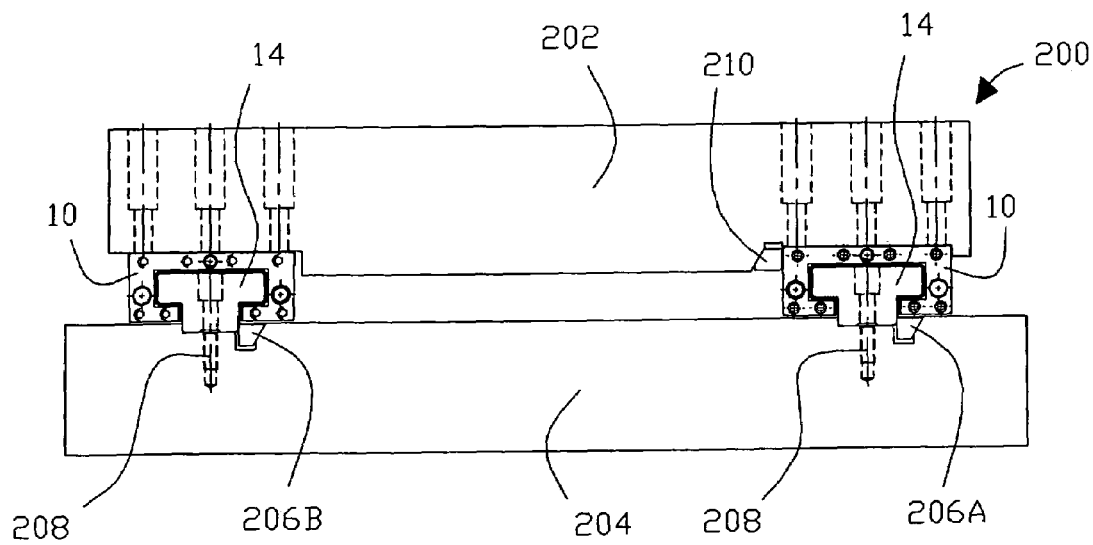

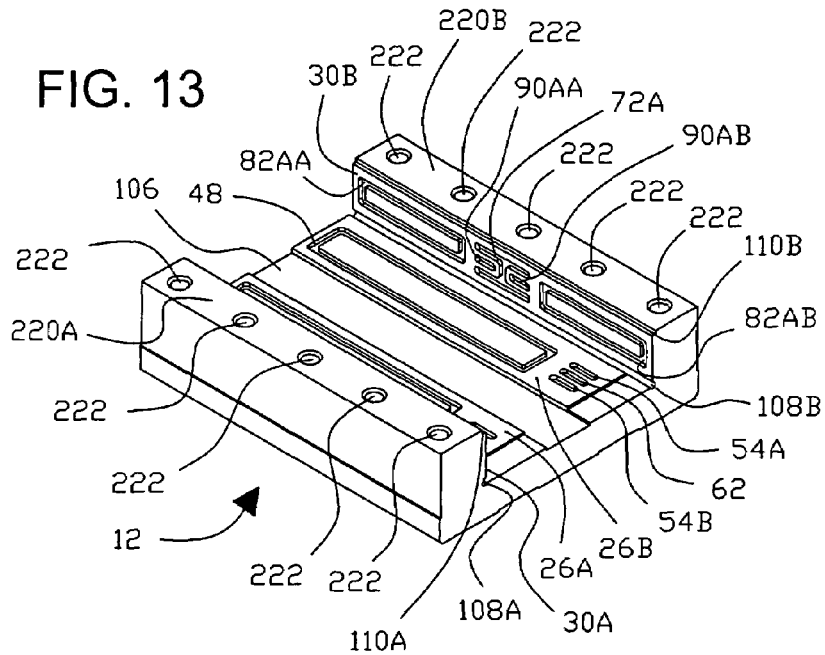
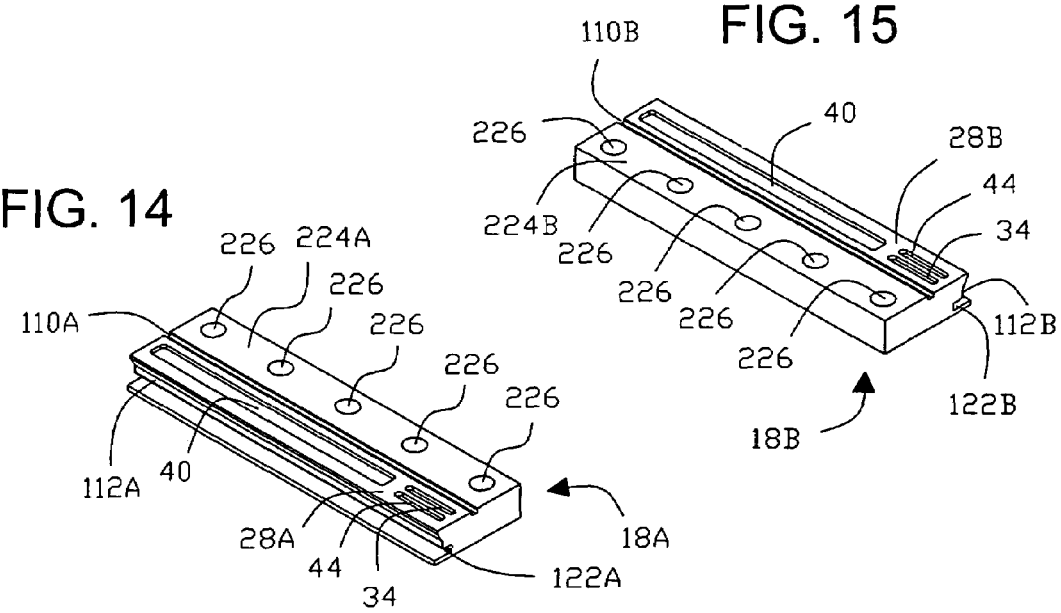

HYDROSTATIC BEARING FOR LINEAR MOTION GUIDANCE

CROSS REFERENCE TO RELATED APPLICATIONS

This application is a divisional of U.S. patent application Ser. No. 10/617,390, filed Jul. 11, 2003 now abandoned, and claims priority from U.S. Provisional Patent Application No. 60/406,933, filed on Aug. 30, 2002, the entire contents of both of which are hereby incorporated into this application by reference.

BACKGROUND OF THE INVENTION

1. Field of the Invention

The invention relates to mechanical bearings and, more particularly, to hydrostatic bearings for linear motion guidance.

2. Description of Related Art

A linear bearing typically includes a carriage and a rail slideably mounted on the carriage. A component, such as a moveable portion of a machine tool, is typically removably mounted on the carriage for sliding movement along the rail with the carriage. A conventional linear bearing uses rolling elements or polymer linings to reduce friction between the carriage and rail.

In a hydrostatic linear bearing, lubricating fluid is pumped into the carriage and rail at high pressures so that a thin film of lubricant is maintained between the carriage and rail as the carriage slides along the rail, even when large loads are applied to the carriage and rail. The lubricating fluid flows into shallow cavities and channels provided in the carriage and rail. These cavities in the carriage and rail are sometimes referred to as bearing pockets.

In order to maintain the thin fluid film between the carriage and the rail, some fluid flow resistance or compensation must be provided in the bearing. Typically, capillary tubes, orifices, and control valves are used to provide the required resistance or compensation. A hydrostatic bearing may also be of the self-compensating type, in which resistive lands in the bearing pockets (i.e., planar areas over which fluid flow is restricted), or other bearing pocket features, are used to provide the required flow resistance or compensation.

Hydrostatic bearings a very desirable in a number of applications because they generally have very high stiffness, high load capacity, low friction, no wear, high damping, and resistance to contamination. All of these advantages make hydrostatic bearings particularly desirable in machine tool applications, where linear bearings with high rigidity and damping capabilities are needed to enable very precise motion that is free of excessive vibration.

Despite their advantages, hydrostatic bearings have not been widely used in the machine tool industry due to a number of practical problems with their installation and use. For example, the typical compensating devices, orifices, and control valves are often too difficult to install properly in machine tools, and may also be delicate, expensive, or too prone to contamination to provide a reasonable useable lifetime. Additionally, the fluid used for lubrication is easily contaminated by chips and coolant used in the machining process. For these reasons, linear bearings based on rolling elements have been used predominantly in the machine tool industry.

SUMMARY OF THE INVENTION

One aspect of the invention relates to a self-compensating hydrostatic bearing. The self-compensating hydrostatic bearing includes a bearing rail and a bearing carriage constructed and arranged to be mounted for hydrostatically supported movement on the bearing rail. The bearing carriage includes a plurality of self-compensating bearing pads provided on surfaces that oppose the bearing rail. The bearing pads are constructed and arranged to be in fluid communication with one another and with a pressurized fluid source.

End sealing structures are provided on end portions of the bearing carriage. At least one edge of the end sealing structures engages the bearing rail to prevent hydrostatic fluid from leaking from between the bearing carriage and the bearing rail. Side sealing structures are provided on side portions of the bearing carriage and extend at least a portion of the length of the bearing carriage. At least one edge of the side sealing structure engages the bearing rail to prevent hydrostatic fluid from leaking from between the bearing carriage and the bearing rail.

The bearing also includes a fluid return system provided within portions of the bearing carriage that are sealed by the end and side sealing structures. The fluid return system is constructed and arranged to route fluid towards the pressurized fluid source.

Another aspect of the invention relates to a self-compensating hydrostatic bearing. The bearing includes a bearing rail having at least one substantially contiguous support surface constructed and arranged to support the hydrostatic bearing and a bearing carriage constructed and arranged to be mounted for hydrostatically supported movement on the bearing rail.

The bearing carriage includes a plurality of self-compensating bearing pads provided on surfaces that oppose the bearing rail. The bearing pads are constructed and arranged to be in fluid communication with one another and with a pressurized fluid source. Sealing structure is provided on portions of the bearing carriage. At least one edge of the sealing structure engages the bearing rail to prevent hydrostatic fluid from leaking from between the bearing carriage and the bearing rail. The bearing carriage also includes a fluid return system provided within portions of the bearing carriage that are sealed by the sealing structure. The fluid return system is constructed and arranged to route fluid towards the pressurized fluid source.

A further aspect of the invention relates to a bearing carriage that comprises one or more bearing pads and a fluid recovery system. The bearing pads are constructed and arranged to receive fluid from a pressurized fluid source and to cause that fluid to flow selectively over a collection of bearing grooves and resistive lands so as to create a supporting fluid layer between the bearing carriage and a structure on which the bearing carriage is mounted for movement.

The fluid recovery system is constructed and arranged to prevent fluid from flowing out of the space between the bearing carriage and the structure on which the bearing carriage is mounted for movement and to route the fluid back towards the pressurized fluid source. The fluid recovery system includes sealing structure having contiguous end and side portions. The end portions are constructed and arranged to seal ends of the bearing carriage and the side portions are constructed and arranged to extend along at least a portion of sides of the bearing carriage to seal the sides. The end portions include a double-lipped seal. A first lip of the double-lipped seal engages the structure on which the bearing carriage is mounted for movement and the second lip of the double-lipped seal prevents debris from entering the bearing carriage. The fluid recovery system also includes reservoir structure defined by portions of the bearing carriage and sealed by the sealing structure and drain grooves constructed and adapted to conduct pressurized fluid from the bearing pads to the reservoir structures.

Further aspects of the invention relate to machine tools or portions thereof mounted on hydrostatic bearings.

Yet another aspect of the invention relates to a bearing carriage. The bearing carriage comprises one or more bearing pads constructed and arranged to receive fluid from a pressurized fluid source and to cause that fluid to flow selectively over a collection of bearing grooves and resistive lands so as to create a supporting fluid layer between the bearing carriage and a structure on which the carriage is mounted for movement.

The bearing carriage also includes a fluid recovery system constructed and arranged to prevent fluid from flowing out of the space between the bearing and the structure on which the bearing carriage is mounted for movement and to route the fluid back towards the pressurized fluid source. The fluid recovery system includes a sealing structure having contiguous end and side portions. The end portions are constructed and arranged to seal ends of the bearing carriage. The side portions are constructed and arranged to extend along at least a portion of the sides of the bearing carriage to seal the sides. The end portions include a double-lipped seal. A first lip of the double lipped seal engages the structure on which the bearing carriage for movement, and a second lip of the double-lipped seal prevents debris from entering the bearing carriage.

The bearing carriage also includes reservoir structures defined by portions of the bearing carriage and sealed by the sealing structure and drain grooves constructed and arranged to conduct pressurized fluid from the bearing pads to the reservoir structures.

Another further aspect of the invention relates to a hydrostatic bearing. The hydrostatic bearing comprises a bearing rail and a bearing carriage constructed and arranged to be mounted for hydrostatically supported movement on the bearing rail. The bearing carriage includes one or more bearing pads provided on surfaces that oppose the bearing rail. The bearing pads are constructed and arranged to be in fluid communication with a pressurized fluid source.

The bearing carriage also includes seal receiving grooves and a sealing structure having contiguous end and side portions. At least a portion of the sealing structure is adapted to be received in the seal receiving grooves. End portions of the sealing structure include double-lipped seals.

A fluid return system is also included in the bearing carriage. The fluid return system includes a plurality of drain grooves in fluid communication with the bearing pads. At least some of the plurality of drain grooves are positioned between the bearing pads and the side portions of the sealing structure.

Yet another further aspect of the invention relates to a method of sealing a hydrostatic bearing carriage. The method comprises causing or allowing hydrostatic fluid to flow from hydrostatic bearing pads provided in the bearing into drain grooves provided along the sides of the bearing carriage. The method also involves preventing leakage from the drain grooves by positioning sealing structures along the sides of the bearing carriage so as to capture hydrostatic fluid flowing out from the drain grooves, collecting the hydrostatic fluid in a reservoir provided as a portion of the hydrostatic bearing carriage, preventing the hydrostatic reservoir from leaving the reservoir except through designated outlets using a first portion of an end sealing structure, and preventing debris from entering the bearing carriage using a second portion of the end sealing structure.

An additional aspect of the invention relates to a hydrostatic bearing pad. The hydrostatic bearing pad comprises a compensating groove, an adjacent pocket groove enclosing a first planar area therein, and a second planar area interposed between the compensating groove and the adjacent pocket groove. The first and second planar areas are constructed and arranged to resist the flow of pressurized fluid when the bearing pad is in a load supporting position relative to another surface. The bearing pad does not include grooves between the compensating groove and the pocket groove.

Other additional aspects of the invention relate to self-compensating hydrostatic bearings having bearing pads as described in the preceding paragraph.

These and other aspects, features and advantages of the invention will be described below.

BRIEF DESCRIPTION OF THE DRAWINGS

The invention will be described with reference to the following drawing figures, in which like numerals represent like features throughout the figures, and in which:

FIG. 7 is another perspective view of the hydrostatic bearing of FIG. 1, with end caps and seals installed;

FIG. 8 is a sectional view through Line 8-8 of FIG. 7 showing the reservoir end caps and end seals of the hydrostatic bearing;

FIG. 9 is a close-up sectional view of a portion of the structure shown in FIG. 8, showing the end caps and seals in more detail;

FIG. 10 is a sectional elevational view of the carriage of FIG. 1 illustrating the side seals;

FIG. 11 is a close-up sectional view of a portion of the structure shown in FIG. 10 in more detail;

FIG. 12 is a side elevational view showing a machine tool table supported on several hydrostatic bearings of the type shown in FIG. 1;

FIG. 13 a perspective view showing the underside of the bearing carriage of FIG. 1;

FIGS. 14 and 15 are perspective views of the keeper portions of the bearing carriage of FIG. 1;

DETAILED DESCRIPTION

Figure 1:
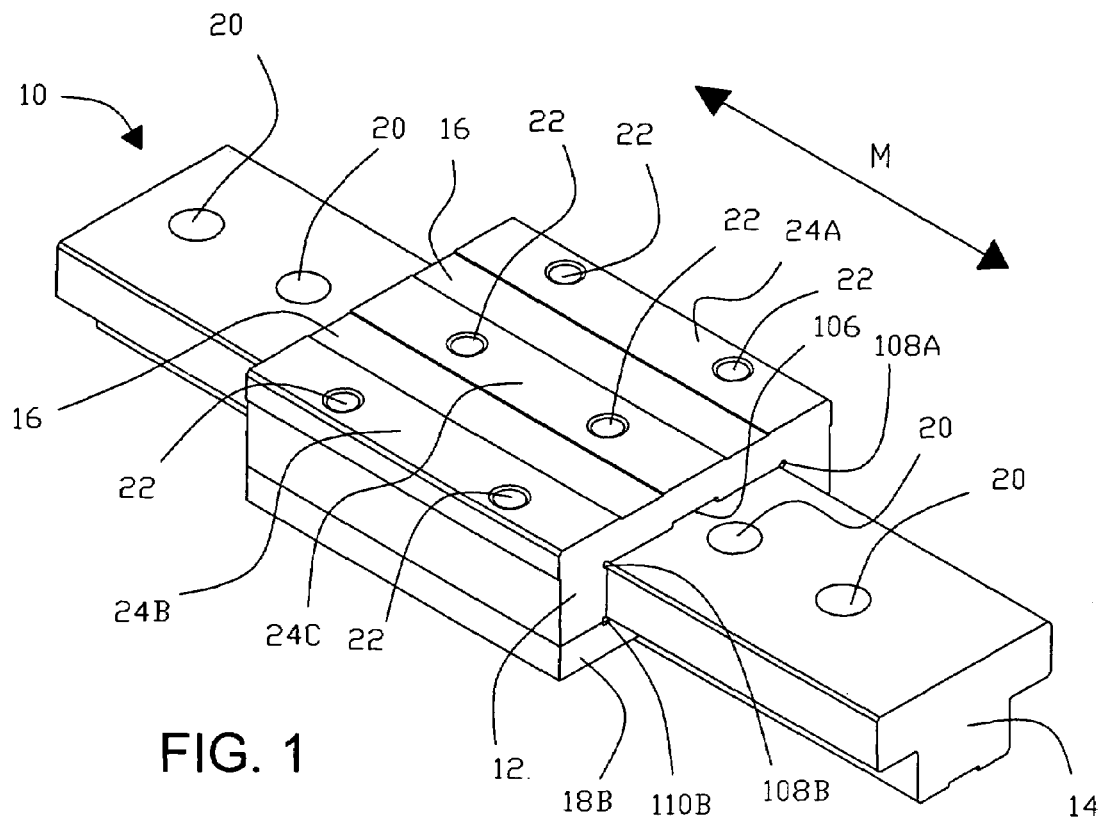
FIG. 1 is a perspective view of a hydrostatic bearing in accordance with the invention without end caps or seals installed.

FIG. 1 is a perspective view of a hydrostatic linear bearing, generally indicated at 10, according to the present invention. The bearing 10 is comprised of a carriage 12 that is mounted for sliding, hydrostatically supported movement along a rail 14. The direction of movement is shown by arrow M in FIG. 1.

In the embodiment shown in FIG. 1, the rail 14 has a "T shaped" cross section. The carriage 12 has a central portion 16 and two keepers, 18A, 18B that are clamped or bolted to the central portion 16 of the carriage 12. Alternatively, the carriage 12 may be fabricated as a single-piece structure; however, the use of the two separable keepers 18A, 18B makes the carriage 12 easier to fabricate, and, in particular, easier to finish grind. If the carriage 12 is fabricated as a single-piece structure, special finish grinding equipment may need to be used.

The carriage 12 also includes a number of drain grooves 106, 108A, 108B, 110A, 110B, 112A, and 112B extending substantially the entirety of the length of the carriage. The drain grooves 106, 108A, 108B, 110A, 110B, 112A, and 112B will be described in more detail below.

The carriage 12 and rail 14 have rectilinear cross-sections in this embodiment of the invention. (The term "rectilinear," as used herein, refers to any shape comprised of line segments without substantial curvature between adjacent segments.) Although rectilinear cross sectional shapes are generally preferred because they are easier to machine, the carriage and rail of a hydrostatic bearing according to the invention may have any desired cross sectional shape. More generally, the carriage 12 may be shaped to engage a rail of substantially any cross-sectional shape.

As shown in FIG. 1, the rail 14 includes drilled and counterbored holes 20 that are used to secure it to a machine tool bed or other rigid structure. The carriage 12 includes drilled and tapped holes 22 such that raised surfaces 24A, 24B, 24C may be clamped rigidly to the mating surface of a machine tool table or other structure that requires linear motion guidance. (The use of the hydrostatic bearing 10 will be described in more detail below.)

In general, the overall size and shape of the carriage 12 and rail 14, and the locations of the holes 20, 22 in the rail and carriage may be selected so as to be "bolt-for-bolt" compatible with and of the same size as standard rolling element linear bearings. It is advantageous if this type of compatible configuration is used, because a hydrostatic bearing 10 according to the invention may then be directly substituted for a rolling element-type linear bearing in an existing machine tool or tool design.

Figure 2:
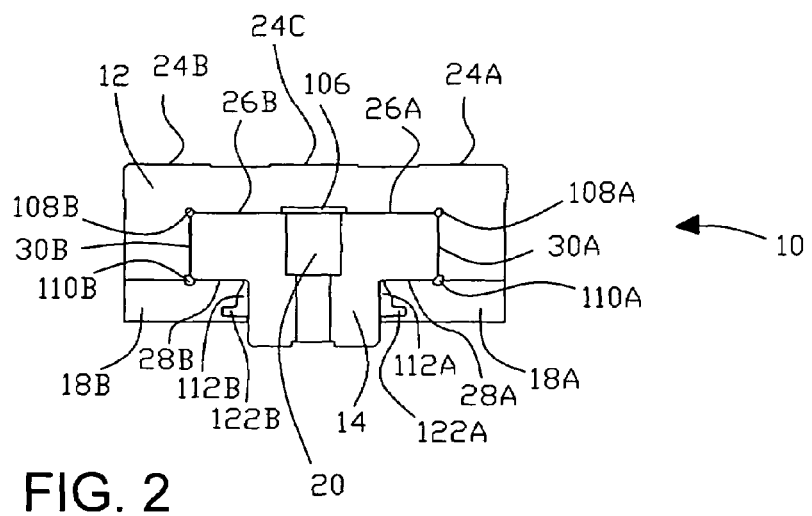
FIG. 2 is a side elevational view of the carriage of FIG. 1.

FIG. 2 is a side elevational view of the carriage 12. The carriage 12 is hydrostatically supported by a number of bearing pads provided in interior surfaces of the carriage 12. The locations of the vertical bearing pads 26A, 26B, 28A, 28B and the horizontal bearing pads 30A, 30B are also shown in the perspective views of FIGS. 13-15 and will be described in more detail below with respect to those figures. (The terms "vertical" and "horizontal," as used with respect to the bearing pads, refer to the direction of the applied loads that the respective bearing pads resist.) Fluid pressure exerted through the bearing pads 26A, 26B, 28A, 28B maintains the bearing carriage 12 at a small distance from the bearing rail 14. Typically, the clearance between the bearing pads 26A, 26B, 28A, 28B, 30A, 30B and the rail 14 would be on the order of about 0.001 inches to about 0.005 inches.

In this description, the terms "fluid" and "hydrostatic fluid" are used interchangeably to refer to any fluid that may be used in a bearing 10 according to the present invention. Many such fluids are known in the art, including hydrocarbon-based oils, silicone-based oils, water, water-based compositions, and air or another suitable gas. In machine tool applications, hydrocarbon-based oils may be preferred for some applications. These oils tend to reduce or eliminate corrosion problems, and may also have relatively high viscosities, which help to reduce the bearing flow rate and associated pumping power needed to pressurize the bearing 10.

Water-based hydrostatic fluids also have certain advantages and may also serve in hydrostatic bearings 10 according to the invention. One advantage of water-based hydrostatic fluid is that if machining coolant (typically a water-based composition) leaks into or mixes with the hydrostatic fluid, it may not present a serious contamination problem. Water-based hydrostatic fluids may also be used in bearings 10 that are produced for the food industry, because of the reduced risk of contaminating the consumable product. Additionally, water-based fluids generally have high thermal conductivities, which enables the heat generated by the pumping process to be removed much more easily.

Figure 3:
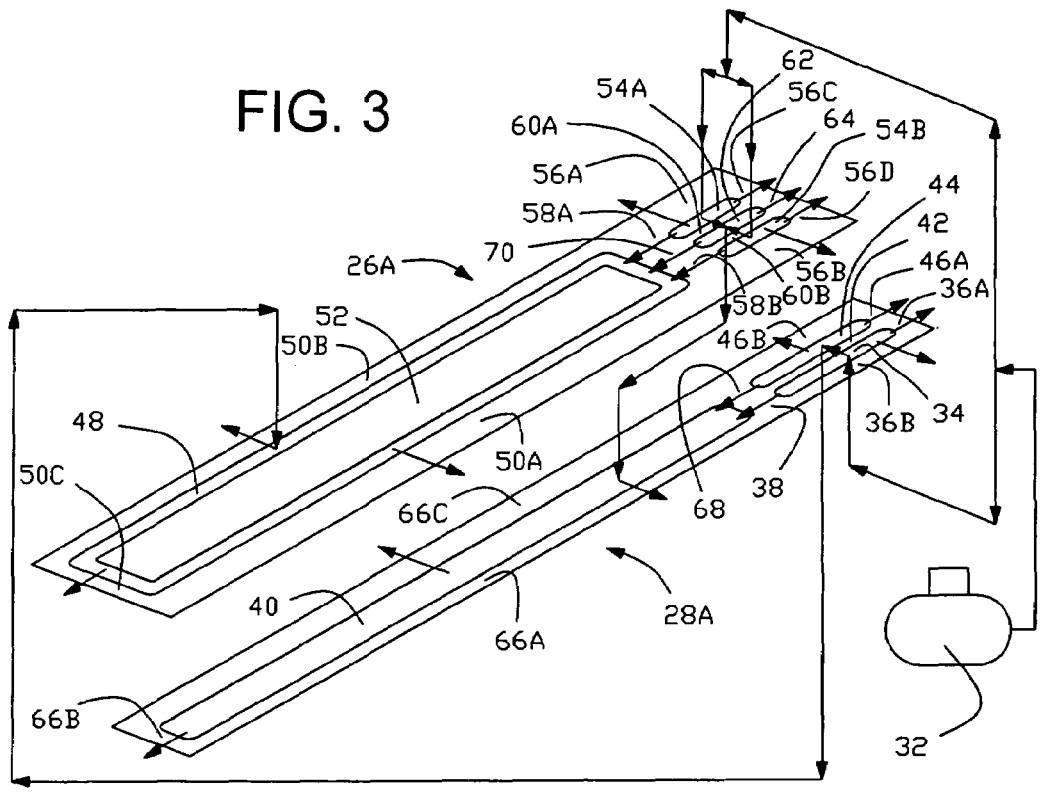
FIG. 3 is a schematic diagram of the vertical bearing pads in the carriage of FIG. 1.

FIG. 3 is a schematic diagram of the vertical pads 26A and 28A, showing their basic geometry and illustrating the route fluid takes through the bearing pads 26A, 28A. Vertical bearing pad 26B is similar in design to pad 26A and is therefore not shown. Vertical bearing pad 28B is identical in design to 28A and is therefore not shown. In the following description, it is assumed that the fluid path is the same in the non-illustrated bearing pads 26B, 28B. However, as those of ordinary skill in the art will realize, the design of the various vertical bearing pads 26A, 26B, 28A, 28B need not be identical.

A lubricating fluid is pressurized and supplied by pump 32 to the upper and lower bearing pads 26A and 28A. (The details of the hydraulic supply of bearings 10 according to the invention will be described below with respect to FIG. 18.) The fluid enters the lower pad 28A at supply groove 34 which has a depth sufficient to allow free flow of fluid within it. Some fluid crosses leakage lands 36A and 36B, which are at a tight gap distance from rail 14, and exits bearing pad 28A. Some fluid crosses land 38 and enters pocket groove 40. Some fluid also crosses compensating land 42 which is at a small distance from the rail 14; this tight gap creates a pressure drop as the fluid enters compensator groove 44. Some fluid leaks from compensator groove 44 across lands 46A and 46B and exits bearing pad 26A. Some fluid is routed from compensator groove 44 to pocket groove 48 of bearing pad 26A. Some fluid leaks out of pocket groove 48 across lands 50A, 50B, and 50C where it exits bearing pad 26A. Fluid is free to flow in the tight gap region between rail 14, and central bearing pad 52, at a pressure that is equal to the fluid pressure in pocket groove 48. Fluid is also supplied at supply pressure from pump 32 to the supply grooves 54A and 54B of pad 26A. Some fluid leaks across lands 56A, 56B, 56C, and 56D and exits the bearing pad 26A. Some fluid crosses from supply grooves 54A and 54B across lands 58A and 58B to pocket groove 48. Some fluid crosses from supply grooves 54A and 54B across compensator lands 60A and 60B to compensator groove 62. Some fluid leaks from compensator groove 62, crosses land 64 and exits bearing pad 26A. Some fluid is routed from compensator groove 62 to bearing pad 28A where it enters pocket groove 40. Some fluid then flows from pocket groove 40 across lands 66A, 66B, and 66C where it exits bearing pad 28A. Fluid can flow between compensator groove 44 and pocket groove 40 but is largely restricted from doing so by land 68. Fluid can flow between compensator groove 62 and pocket groove 48 but is largely restricted from doing so by land 70.

Grooves 54A, 54B, 62, 48, 34, 44, and 40 all should have a depth that is at least about three times larger than the clearance between the pads 28A and 26A and the rail 14 to ensure uniform pressure within each of these grooves. In the case of grooves 48 and 40, uniform pressure is desired to spread the load-supporting pressure over the entire pocket area. In the case of grooves 54A, 54B, 62, 34, and 44, uniform pressure is desired in order to yield the proper hydraulic resistance on the adjacent lands so that the pressure in the respective bearing areas can be adequately controlled.

Pad 26A should be fabricated such that lands 52, 50A, 50B, 50C, 60A, 60B, 56A, 56B, 56C, 56D, 64, 58A, 58B, and 70 are preferably all on the same plane and at the same tight gap distance to rail 14. Pad 28A should be fabricated such that lands 66A, 66B, 66C, 42, 46A, 46B, 36A, 36B, 38, and 68 are preferably all on the same plane and at the same tight gap distance to rail 14.

Figure 4:
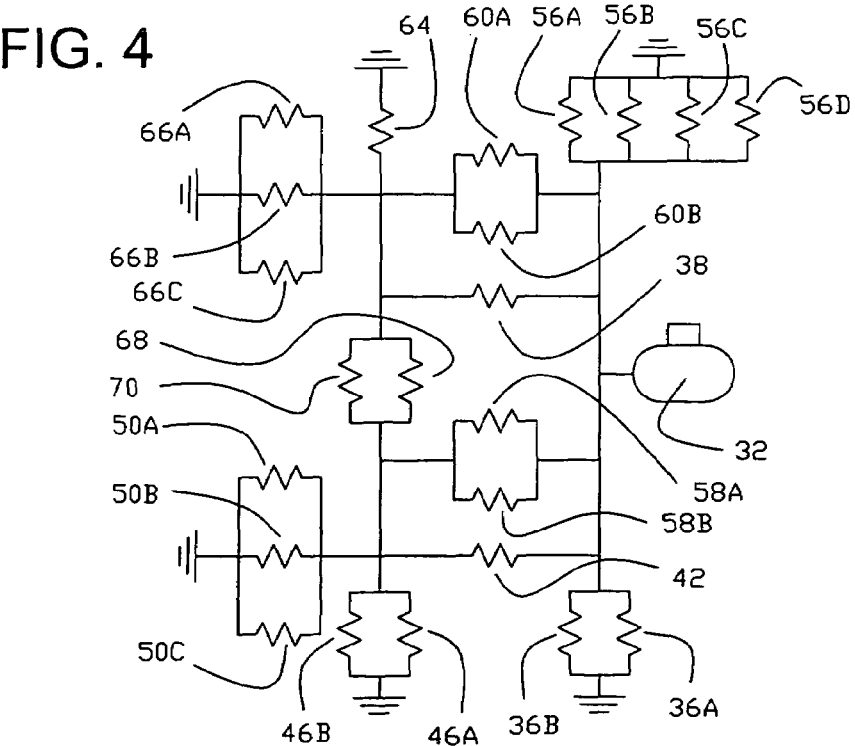
FIG. 4 is a fluid circuit diagram showing the resistances of the bearing pads of FIG. 3.

FIG. 4 is a fluid circuit diagram of the vertical bearing pads 26A and 28A (which are identical to the counterpart vertical bearing pads 26B and 28B). The various lands described above with respect to FIG. 3 are shown in FIG. 4 as circuit resistors. The values of the land resistances, which can be calculated by those skilled in the art of fluid dynamics, is dependent upon the fluid viscosity, the length and width of the lands, and the clearance between each land and the rail 14. The fluid circuit shown in FIG. 4 can be solved by those skilled in the art of circuit analysis to compute the pressure in each of the bearing grooves. These pressures may then be multiplied by the corresponding bearing areas to yield the overall vertical force developed by the bearing.

In order to evaluate how the bearing force changes in response to a change in vertical position of the carriage 12 with respect to the rail 14, the fluid gap between the carriage 12 and the rail 14 that was used to calculate the land resistances would be changed and the analysis described above would be repeated with the new fluid gap data. A computer program could be used to carry out this repetitive analysis. Although the bearing pad geometries may be chosen to suit particular applications of the hydrostatic bearing 10, it is preferable if the the bearing groove and land geometry are optimized to provide very high bearing stiffness and load capacity in the vertical direction with the minimum possible flow rate of fluid through the bearing 10 because high fluid flow rates typically require great amounts of pumping power.

Grooves 54A, 54B, 62, 48, 34, 44, and 40 are shown in FIG. 3 with rounded corners; however, they may be fabricated with sharp square corners or another geometric profile without considerable effect on bearing operation, since the hydraulic resistances of the adjacent lands will change by a very small percentage of their overall resistance values.

As shown in FIG. 3 and described above, fluid is routed between pad 28A and pad 26A in two places, from compensator groove 44 to pocket groove 48, and from compensator groove 62 to pocket groove 40. These fluid transfers may be accomplished by the use of drilled holes in carriage 12 and keeper 18A, or they may be accomplished with the use of rigid tubing external to carriage 12. Similarly, fluid may be routed at supply pressure from pump 32 to supply grooves 34, 54A, and 54B with the use of external tubing followed by holes drilled in carriage 12 and keeper 18A.

Figure 5:
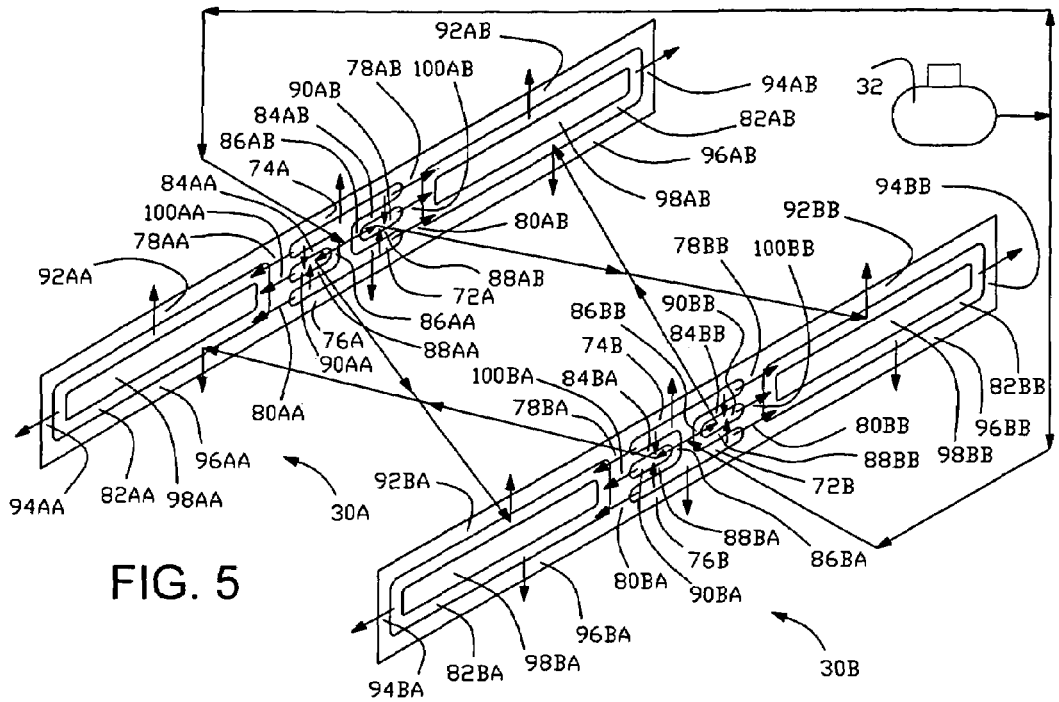
FIG. 5 is a schematic diagram of the horizontal bearing pads of the carriage of FIG. 1.

FIG. 5 is a schematic view of the horizontal bearing pads 30A and 30B, showing their basic geometry and illustrating the route that fluid takes through the bearing pads 30A, 30B. A lubricating fluid is pressurized and supplied by pump 32 to the upper and lower bearing pads 30A and 30B. (The same pump 32 may be used to supply the horizontal bearing pads 30A, 30B and the vertical bearing pads 26A, 26B, 28A, 28B, or two different pumps 32 may be used.) The fluid enters pad 30A at supply groove 72A which is at a depth sufficient to allow free flow of fluid within it. Some fluid leaks from supply groove 72A across leakage lands 74A and 76A, which are at a tight gap distance from rail 14, and exits bearing pad 30A. Some fluid flows from supply groove 72A across lands 78AA and 80AA to pocket groove 82AA and some flows across lands 78AB and 80AB to pocket groove 82AB. Some fluid flows from supply groove 72A across compensator lands 84AA, 86AA, 88AA to compensator groove 90AA. Some of the fluid which enters compensator groove 90AA leaks to or from pocket groove 82AA across land 100AA. The remainder of the fluid which enters compensator groove 90AA is routed to bearing pad 30B where it enters pocket groove 82BA and provides uniform pressure to pocket groove 82BA before leaking across lands 92BA, 94BA, and 96BA and exiting bearing pad 30B. The fluid in the tight clearance of bearing pad 98BA will be at a pressure equal to the fluid pressure in pocket groove 82BA because pocket groove 82BA completely surrounds bearing pad 98BA. Fluid is also supplied at supply pressure from pump 32 to supply groove 72B of bearing pad 30B. Some of the fluid which enters supply groove 72B leaks across lands 74B and 76B and exits bearing pad 30B. Some of the fluid which enters supply groove 72B leaks across lands 78BA and 80BA to pocket groove 82BA, and some leaks across lands 78BB and 80BB to pocket groove 82BB. Some of the fluid which enters supply groove 72B leaks across compensator lands 84BA, 86BA, and 88BA to compensator groove 90BA. Some fluid may across land 100BA between compensator groove 90BA and pocket groove 82BA. The remainder of fluid entering compensator groove 90BA is routed to pad 30A where it enters pocket grooves 82AA and leaks across lands 92AA, 94AA, and 96AA and exits bearing pad 30A. The fluid in the tight gap clearance of bearing pad 98AA will be at a pressure equal to the fluid pressure in pocket groove 82AA because pocket groove 82AA completely surrounds bearing pad 98AA. Some of the fluid which enters supply groove 72A leaks across compensator lands 84AB, 86AB, and 88AB to compensator groove 90AB. Some fluid may across land 100AB between compensator groove 90AB and pocket groove 82AB. The remainder of fluid entering compensator groove 90AB is routed to pad 30B where it enters pocket groove 82BB and leaks across lands 92BB, 94BB, and 96BB and exits bearing pad 30B. The fluid in the tight gap clearance of bearing pad 98BB will be at a pressure equal to the fluid pressure in pocket groove 82BB because pocket groove 82BB completely surrounds bearing pad 98BB. Some of the fluid which enters supply groove 72B leaks across compensator lands 84BB, 86BB, and 88BB to compensator groove 90BB. Some fluid may across land 100BB between compensator groove 90BB and pocket groove 82BB. The remainder of fluid entering compensator groove 90BB is routed to pad 30A where it enters pocket groove 82AB and leaks across lands 92AB, 94AB, and 96AB and exits bearing pad 30A. The fluid in the tight gap clearance of bearing pad 98AB will be at a pressure equal to the fluid pressure in pocket groove 82AB because pocket groove 82AB completely surrounds bearing pad 98AB.

Grooves 82AA, 82AB, 82BA, 82BB, 90AA, 90AB, 90BA, 90BB, 72A, and 72B all should have a depth that is at least three times larger than the clearance between the pads 30A and 30B and the rail 14 to ensure uniform pressure within each of these grooves. In the case of grooves 82AA, 82AB, 82BA, and 82BB, uniform pressure is desired in order to spread the load-supporting pressure over the entire pocket area. In the case of grooves 90AA, 90AB, 90BA, 90BB, 72A, and 72B, uniform pressure is desired in order to yield the proper hydraulic resistance on the adjacent lands so that the pressure in the respective bearing areas can be adequately controlled.

Pad 30A is fabricated such that lands 98AA, 98AB, 84AA, 84AB, 86AA, 86AB, 88AA, 88AB, 92AA, 92AB, 94AA, 94AB, 96AA, 96AB, 78AA, 78AB, 80AA, 80AB, 100AA, 100AB, 74AA, 74AB, 76AA, 76AB are preferably all on the same plane and at the same tight gap distance to rail 14. Pad 30B should be fabricated such that lands 98BA, 98BB, 84BA, 84BB, 86BA, 86BB, 88BA, 88BB, 92BA, 92BB, 94BA, 94BB, 96BA, 96BB, 78BA, 78BB, 80BA, 80BB, 100BA, 100BB, 74BA, 74BB, 76BA, 76BB are preferably all on the same plane and at the same tight gap distance to rail 14.

Figure 6:
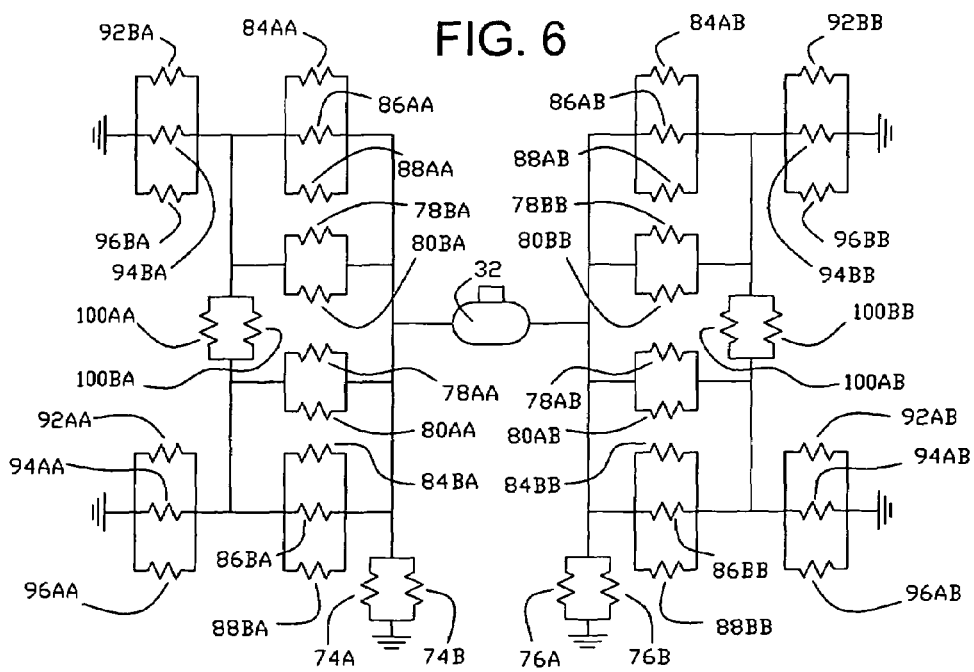
FIG. 6 is a fluid circuit diagram showing the resistances of the bearing pad of FIG. 5.

FIG. 6 is a schematic diagram showing the fluid resistances of the horizontal bearing pad 30A. Each of the resistances shown in FIG. 6 represents one of the lands of the horizontal bearing pad 5A. The values of the resistances of the horizontal bearing pad 30A may be calculated as was described above with respect to the vertical bearing pads 26A, 26B, 28A, 28B.

Grooves 82AA, 82AB, 82BA, 82BB, 90AA, 90AB, 90BA, 90BB, 72A, and 72B are shown in FIG. 5 with rounded corners; however, they may be fabricated with sharp square corners or another geometric profile without considerable effect on bearing operation since the hydraulic resistances of the adjacent lands will change by a very small percentage of their overall resistance values.

As shown in FIG. 5, fluid is routed between pad 30A and pad 30B in four places: from compensator groove 90AB to pocket groove 82BB, from compensator groove 90AA to pocket groove 82BA, from compensator groove 90BA to pocket groove 82AA, and from compensator groove 90BB to pocket groove 82AB. As with the fluid transfers in the vertical bearing pads 26A, 26B, 28A, 28B, these fluid transfers may be accomplished by the use of drilled holes in carriage 12, or they may be accomplished with the use of rigid tubing external to carriage 12. Similarly, fluid may be routed at supply pressure from pump 32 to supply grooves 72A and 72B with the use of external tubing followed by holes drilled in carriage 12.

In the vertical and horizontal bearing pads shown in FIGS. 3 and 5 and described above, lands 58A, 58B, 70, 38, 68, 78AA, 78AB, 78BA, 78BB, 80AA, 80AB, 80BA, 80BB, 100AA, 100AB, 100BA, and 100BB allow leakage paths between adjacent compensators, pockets, and supply grooves. These leakage paths tend to reduce the pressure response of the bearing and therefore reduce its stiffness and load-carrying capability. However, a greater factor that overcomes the effect of these fluid leakage paths is the ability to arrange pocket grooves 48, 40, 82AA, 82AB, 82BA, and 82BB such that they are closer to the compensating grooves, and, therefore, spread the load-supporting pocket pressures over a larger area. By better utilizing the available pad area, the bearing pad configurations of the hydrostatic bearing 10 provide higher stiffness and load capacity.

FIG. 7 is another perspective view of the hydrostatic bearing of FIG. 1, with its seals and endcaps installed. FIG. 8 is a sectional view through Line 8-8 of FIG. 7, and FIG. 9 is a close-up view of portion A (enclosed in dotted line) of FIG. 8. FIGS. 7-9 show the hydrostatic bearing of FIG. 1 with end caps 102A and 102B attached to carriage 12 and keepers 18A and 18B. End caps 102A and 102B contain reservoirs 104A and 104B (visible in the views of FIGS. 8 and 9) to which the fluid flows into from bearing pads 26A, 26B, 28A, 28B, 30A, and 30B as well as from drain grooves 106, 108A, 108B, 110A, 110B, 112A, and 112B. (As was described above, the drain grooves are provided at the corners of the carriage 12 and are visible in the views of FIGS. 1 and 2.) Double-lipped end seals 114A and 114B are attached to end caps 102A and 102B. The double-lipped end seals 114A, 114B are attached to rigid plates 113A, 113B in order to provide them with additional stiffness. Lips 116 of end seals 114A and 114B are in sliding engagement with rail 14 and serve to trap the fluid into reservoirs 104A and 104B and largely prevent fluid from leaking directly out of the hydrostatic bearing 10. The fluid flows out of reservoirs 104A or 104B through at least one drain outlet 118A and/or 118B. One or more of the drain outlets 118A, 118B may be plugged, but at least one drain outlet 118A, 118B is used to route the fluid to a hose or tubing assembly, where the fluid is returned to the hydraulic supply source.

FIG. 10 is a sectional side elevational view of the hydrostatic bearing 10, illustrating side seals 120A and 120B that are received by acceptor grooves 122A and 122B within keeper portions 18A and 18B of the bearing carriage 12. FIG. 11 is an enlarged sectional view of portion B of FIG. 10, illustrating the side seals 120A, 120B in more detail. The side seals 120A, 120B slidingly engage the bearing rail 14, serve to trap fluid, and allow the trapped fluid to be routed through drain grooves 112A and 112B into reservoirs 104A and 104B to prevent fluid from leaking directly out of the hydrostatic bearing 10. As shown in FIG. 11, the side seals 120A, 120B have a generally u-shaped portion 121 that opens upwardly, towards the top of the drain groove 112A, 112B. The side seals 120A, 120B are positioned in the acceptor groove 122A, 122B such that one wall of the u-shaped portion 121 of the side seal 120A, 120B is in contact with the keeper 18A, 18B and the other wall of the u-shaped portion 121 is in contact with the bearing rail 14.

FIG. 13 is a perspective view of the underside of the central portion 16 of the carriage 12 without the keepers 18A, 18B installed. FIG. 13 shows the relative locations and extents of the vertical bearing pads 26A, 26B and the horizontal bearing pads 30A, 30B. FIGS. 14 and 15 are perspective views of the keepers 18A and 18B, showing the locations and extents of vertical bearing pads 28A and 28B on the keepers 18A and 18B. The positions of the drain grooves 106, 108A, 108B, 110A, 110B, 112A, and 112B and seal acceptor grooves 122A, 122B are also shown.

Each side of the central portion 16 of the bearing carriage 12 has a set of threaded holes 222 provided in respective connecting surfaces 220A and 220B. A set of complimentary, counterbored through holes 226 are provided in the keepers 18A and 18B. When the keepers 18A and 18B and central portion 16 of the carriage 12 are assembled, bolts are inserted through the holes 226 in the keepers 18A, 18B and into the threaded holes 222 of the central portion 16 of the carriage 12 such that the engaging surfaces 220A, 220B of the central portion 16 and the engaging surfaces 224A, 224B of the keepers 18A, 18B are adjacent, as shown in FIG. 10.

The bearing pad grooves and other surface features shown in FIGS. 13-15 may be formed by milling, electrical discharge machining, or other known techniques.

Figure 16:
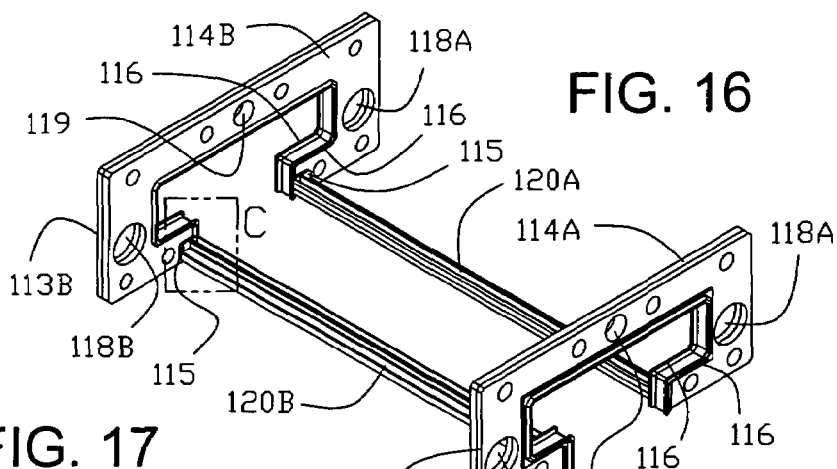
FIG. 16 is a perspective view of the side and end seals of the bearing carriage of FIG. 1 in isolation without the bearing carriage itself.
Figure 17:
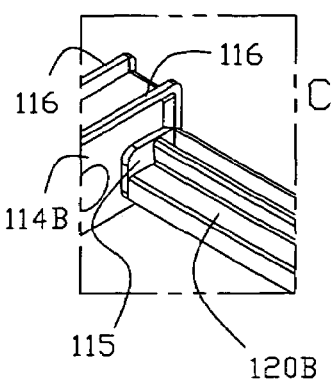
FIG. 17 is a close-up perspective view of a portion of the side and end seals shown in FIG. 16, illustrating the engagement of the side and end seals.

FIG. 16 is a perspective view showing the end seals 114A, 114B and side seals 120A, 120B in isolation. As was described above, the end seals 114A, 114B are constructed of a rubber material molded so as to attach to rigid plates 113A, 113B, for example, steel or aluminum plates, to provide them with greater rigidity. In alternative embodiments, the end seals 114A, 114B may not be attached to rigid plates 113A, 113B As is shown best in FIG. 17, a close-up perspective view of portion "C" of FIG. 16, the side seals 120A, 120B are inserted into receptacles 115 formed in the end seals 114A, 114B such that they have an interference fit with the receptacles 115. In one embodiment, the side seals 120A, 120B may be made slightly longer than required, such that they can be maintained in compression during operation. In alternative embodiments of the invention, the side seals 120A, 120B and the end seals 114A, 114B may be molded or cast as a single structure, bonded together, or otherwise caused to adhere to one another to form a unitary structure.

The bearing pads 26A, 26B, 28A, 28B, 30A, 30B described above are designed for a self-compensating hydrostatic bearing. However, those of ordinary skill in the art will realize that the other features of the carriage 12 and rail 14, including the sealing structures (i.e., the end seals 114A, 114B and side seals 120A, 120B) and the drain grooves 106, 108A, 108B, 110A, 110B, 112A, and 112B may be used without the particular bearing pads 26A, 26B, 28A, 28B, 30A, 30B described above. For example, in alternative embodiments of the invention, a carriage having end seals, side seals and a drain groove arrangement similar to that described above could be used with bearing pads that are not self-compensating. Bearing pads that are not self-compensating could use capillary tubes or valves for compensation purposes, as one of ordinary skill in the art will readily be able to appreciate.

Conversely, the self-compensating bearing pads 26A, 26B, 28A, 28B, 30A, 30B described above may be used on other types of hydrostatically supported devices and in other types of fluidstatic bearings without the other features described herein.

Figure 18:
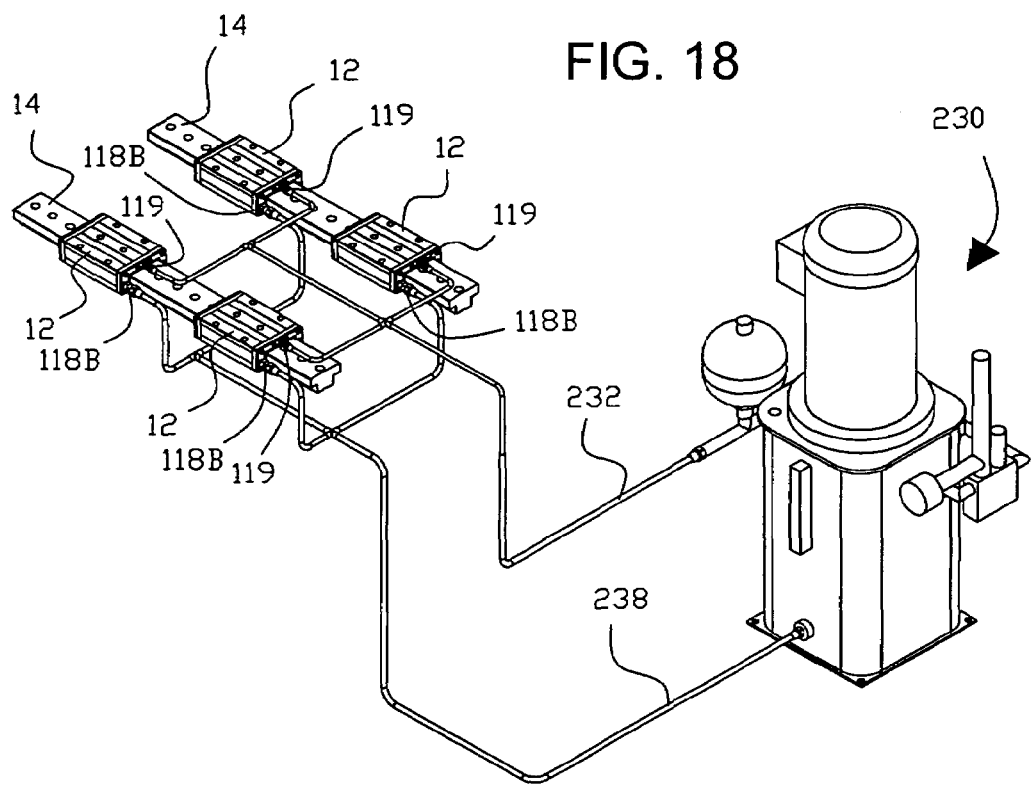
FIG. 18 is a schematic perspective view of several hydrostatic bearings according to the invention connected to a hydraulic power unit.

FIG. 18 is a schematic perspective view illustrating four bearing carriages 12 riding on two carriage rails 14. In general, several bearing carriages 12 may be provided on the same carriage rail 14, particularly if those bearing carriages 12 are fixed in position with respect to one another (e.g., by being bolted to the bed of a machine tool, as will be described below). Alternatively, several shorter segments of bearing rail 14 could be provided, one segment for each bearing carriage 12.

FIG. 18 also illustrates the details of the hydraulic fluid connections for the bearings 10 according to the present invention. A hydraulic power unit 230 delivers hydraulic fluid under high pressure through a conduit 232. The hydraulic power unit 230 includes all of the components necessary to deliver temperature controlled fluid that is relatively free of contaminant particles at high pressure with minimal pressure pulsations. For example, the hydraulic power unit 230 may include a reservoir, a pump, an electric motor, a filter, a pressure regulating valve, a pressure gauge, and a heat rejection system, such as an air-to-oil heat exchanger.

The conduit 232 from the hydraulic power unit 230 branches such that one branch connects with each bearing carriage 12. The branches of the conduit 232 are received by a fluid inlets 119 in the end seals 114A, 114B of the bearing carriages 12. (Depending on the configuration of the bearings 10, the conduit 232 may connect to a fluid inlet 119 on either end seal 114A, 114B. The unused fluid inlet 119 may be plugged or omitted.) The connection between the conduit 232 branch and the fluid inlet 119 of the end seal may be any appropriate type of conventional hydraulic connection. From the fluid inlet 119, the pressurized fluid is distributed to the supply grooves 34, 54A, 54B by an internal network of passageways. Once used, the fluid is collected in the reservoirs 104A, 104B and returned via return conduits 238, which connect to the drain outlets 118A, 118B and the return portions of the hydraulic power unit 232.

FIG. 12 is a side elevational view of a machine tool 200, illustrating a typical application for a hydrostatic bearing 10 according to the present invention. A machine tool table 66 is supported by four bearing assemblies 10 which ride on two rails 14. Although only two bearing assemblies 10 are shown, at least four are typically used to provide adequate pitch and yaw stability to table 202. The rails 14 of the hydrostatic bearings 10 are horizontally clamped to a machine bed 204 using wedges 206A and 206B. The rails 14 are clamped vertically to machine bed 204 using a plurality of bolts 208 threadedly secured within machine bed 204 through counterbored holes 20 provided in the rail 14. Two of the hydrostatic bearings 10 are clamped horizontally to the table 202 using wedges 210 (one wedge 210 is shown in the view of FIG. 12). The other two hydrostatic bearings 10 are floated into alignment by pressurizing them with lubricating fluid, thus allowing hydrostatic bearings 10 to float horizontally into a self-aligning position. Once the two wedge-secured hydrostatic bearings 10 are in alignment, the bolts that secure them to the table 202 are tightened. Although FIG. 12 illustrates the use of wedges 206A, 206B, and 210, many other mechanisms to clamp the rails 14 and the hydrostatic bearings 10 are possible and are within the scope of the invention.

A hydrostatic bearing 10 may be used in a number of different types of machine tools, and in any other application in which linear motion guidance is required. However, hydrostatic bearings 10 according to the invention may be particularly beneficial when used in lathes. For example, hydrostatic bearings 10 may be used in the QUEST® turning machines manufactured by HARDINGE, Inc. (Elmira, N.Y., United States). Hydrostatic bearings 10 may also be useful in grinding machines, milling machines, boring machines, and other machine tools in which a combination of high stiffness and damping are beneficial.

A hydrostatic bearing 10 according to the present invention may have certain advantageous performance characteristics. For example, a hydrostatic bearing 10 according to the invention would typically have high static and dynamic stiffnesses. A hydrostatic bearing 10 may also operate with very low friction, because the seals described above with respect to FIGS. 7-11 would generally be the only components creating friction. Because the carriage 12 rides on a layer of fluid, and for other reasons, the hydrostatic bearing 10 may have up to ten times the force damping capabilities of a conventional rolling element linear bearing. Additional advantages may include an essentially unlimited translational (feed) rate, an essentially unlimited fatigue life (with substantially no component wear because the carriage 12 and rail 14 are not in contact), substantially no change in positioning accuracy of a machine tool mounted on hydrostatic bearings 10 over time, substantially no damage to the hydrostatic bearing 10 under heavy "crash" loads (i.e., when the bearing 10 stops suddenly at the ends of its travel range).

Moreover, the hydrostatic bearing 10 is self cleaning if fluid flow is maintained between the carriage 12 and rail continuously 14.

When installed in a machine tool and used to produce parts, the features of the hydrostatic bearing 10 may also lead to certain other advantages. For example, the hydrostatic bearing 10 may improve tool life. Additionally, parts may be produced with better surface finishes and better roundnesses for round parts. A machine tool mounted on hydrostatic bearings 10 may also have improved hard turning capability, improved interrupted cutting capability, and improved positioning accuracy. Some of the advantages and benefits described above will become apparent from the following example.

EXAMPLE 1

A hydrostatic bearing 10 according to the invention is installed so as to support operational movement in a QUEST® 51 turning machine (Hardinge, Inc., Elmira, N.Y., United States) using the installation procedure described above. Four hydrostatic bearings 10 according to the present invention are installed to guide motion in the X-axis and four are installed to guide motion in the Z-axis. No adaptations to the turning machine are required in order to accommodate the hydrostatic bearings 10; however, hydraulic hoses are provided for each hydrostatic bearing 10. A two-inch round A2 tool steel blank was prepared with four slots milled around its circumference for interrupted cutting. It was then hardened to 60-62 Rc. The part was then roughed with a 5/16 inch diameter round cubic boron nitride (CBN) insert at 450 SFM/0.002 ipr/0.030 doc with five passes. Subsequently, the part was finished with a 55 degree CBN insert at 550 SFM/0.003 ipr/0.005 doc with one pass, and then threaded with a CBN triangular insert. The surface finish of the part was consistently in the 5 to 6 microinch range, an improvement of approximately a factor of two when compared with an identical part machined on a comparable QUEST® 51 turning machine without a hydrostatic bearing. Additionally, the tool life of the interrupted turning insert was increased by a factor of three when compared to the life of an insert used on the turning machine without the hydrostatic bearing.

Although the invention has been described with respect to certain embodiments, those embodiments are intended to be illustrative, rather than limiting. Modifications and variations to the invention are possible, within the scope of the appended claims.

What is claimed is:

1. A hydrostatic bearing carriage constructed and arranged to be mounted for hydrostatically supported movement on a bearing rail, said bearing carriage comprising a plurality of self-compensating bearing pads, said plurality of bearing pads being constructed and arranged to be in fluid communication with a pressurized fluid source, each of the bearing pads comprising:

a planar surface that is constructed and arranged to resist the flow of pressurized fluid when in a load supporting position relative to the bearing rail;

a compensating groove in the planar surface, the compensating groove being fluidly connected to a pocket groove on an other of the plurality of bearing pads;

a pocket groove in the planar surface, the pocket groove being fluidly connected to a compensating groove on the other of the plurality of bearing pads, the pocket groove being constructed and arranged to receive pressurized fluid from the compensating groove on the other of the plurality of bearing pads;

a supply groove in the planar surface, the supply groove being constructed and arranged to be in fluid communication with and receive pressurized fluid from the pressurized fluid source; and one or more drain grooves completely surrounding the planar surface, wherein the planar surface separates the compensating groove, pocket groove, and supply groove from each other and from the one or more drain grooves, wherein the planar surface surrounds the compensating groove, the pocket groove, and the supply groove, wherein the pocket groove does not surround the compensating groove or supply groove, wherein the planar surface does not include a drain groove that separates the pocket groove from the supply groove, and wherein the supply groove is at least partially interposed between the compensating groove and the one or more drain grooves.

2. The hydrostatic bearing carriage of claim 1, further comprising:

a fluid return system operatively connected to the one or more drain grooves; and a seal structure completely surrounding the one or more drain grooves.

3. The hydrostatic bearing carriage of claim 2, wherein the fluid return system further comprises a fluid return conduit in fluid communication with the one or more drain grooves, the fluid return conduit being constructed and arranged to direct fluid from the one or more drain grooves to the pressurized fluid source.

4. The hydrostatic bearing carriage of claim 1, wherein the supply groove prevents fluid from leaking from the compensating groove to an outer edge of said planar surface.

5. The hydrostatic bearing carriage of claim 1, wherein a position of the supply groove reduces a fluid leakage path between the compensating groove and an outer edge of said planar surface.

6. The hydrostatic bearing carriage of claim 1, wherein the supply groove is at least partially interposed between the compensating groove and an outer edge of said planar surface.

7. The hydrostatic bearing carriage of claim 1, further comprising a seal structure completely surrounding the one or more drain grooves.

8. The hydrostatic bearing carriage of claim 7, wherein the seal structure follows a non-planar path around the one or more drain grooves.

9. The hydrostatic bearing carriage of claim 8, wherein the seal structure does not separate the bearing pads from each other.

10. A hydrostatic bearing carriage constructed and arranged to be mounted for hydrostatically supported movement on a bearing rail, said bearing carriage comprising:

first and second bearing pads constructed and arranged to receive fluid from a pressurized fluid source, the first and second bearing pads comprising first and second planar surfaces, respectively, and first and second bearing grooves in the first and second surfaces, respectively, to cause that fluid to flow selectively over the bearing grooves and planar surfaces so as to create a supporting fluid layer between said bearing carriage and the bearing rail, and a fluid return system constructed and arranged to discourage fluid from flowing out of the space between said bearing carriage and the bearing rail and to route the fluid back towards the pressurized fluid source, said fluid return system comprising
   drain grooves that surround the first and second bearing pads, and
   a sealing structure that surrounds the drain grooves,
wherein the sealing structure is not constructed and arranged to form a complete ring around the rail, and
wherein the first planar surface is not coplanar with the second planar surface.

11. The hydrostatic bearing carriage as claimed in claim 10, wherein the sealing structure does not separate the first and second planar surfaces from each other.

12. The hydrostatic bearing carriage as claimed in claim 10, wherein the scaling structure follows a non-planar path around the bearing pads.

13. The hydrostatic bearing carriage of claim 10, wherein said bearing carriage further comprises one or more reservoirs in fluid communication with the one or more drain grooves.

14. The hydrostatic bearing carriage of claim 10, wherein the sealing structure has end and side portions, and wherein the side portions of said sealing structure have a substantially upwardly-facing u-shaped cross-section.

15. The hydrostatic bearing carriage of claim 10, wherein at least one of the drain grooves extends along the length of the bearing carriage.

16. The hydrostatic bearing carriage of claim 10, wherein the fluid return system further comprises a fluid return conduit in fluid communication with the drain grooves, the fluid return conduit being constructed and arranged to direct fluid from the drain grooves to the pressurized fluid source.

* * * * *